(12) United States Patent
Luh

(10) Patent No.: US 6,748,309 B2
(45) Date of Patent: Jun. 8, 2004

(54) ARRANGEMENT AND METHOD FOR DETERMINING THE TRANSMISSION RATIO OF A CONTINUOUSLY VARIABLE BELT TRANSMISSION

(75) Inventor: Joachim Luh, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/323,749

(22) Filed: Dec. 20, 2002

(65) Prior Publication Data

US 2003/0119627 A1 Jun. 26, 2003

(30) Foreign Application Priority Data

Dec. 22, 2001 (DE) .......................... 101 63 842

(51) Int. Cl.[7] .............................................. B60K 44/12
(52) U.S. Cl. ........................... 701/62; 701/51; 477/34; 477/36; 477/46; 474/8; 474/69
(58) Field of Search .................... 701/62, 63, 51, 701/53; 477/34, 35, 36, 44, 46; 474/8, 69, 70, 80, 101, 102, 201

(56) References Cited

U.S. PATENT DOCUMENTS

| 5,337,628 | A | * | 8/1994 | Hendriks et al. ............. 477/48 |
| 5,431,602 | A | * | 7/1995 | Hendriks et al. ............. 474/28 |
| 6,146,294 | A | * | 11/2000 | Bolz ............................. 474/8 |
| 6,547,692 | B1 | * | 4/2003 | Ries-Mueller et al. ........ 477/45 |
| 6,547,693 | B1 | * | 4/2003 | Bolz et al. .................... 477/45 |

* cited by examiner

Primary Examiner—William A Cuchlinski, Jr.
Assistant Examiner—Olga Hernandez
(74) Attorney, Agent, or Firm—Walter Ottesen

(57) ABSTRACT

The invention relates to an arrangement and a method for determining the transmission ratio of a continuously variable transmission having a drive end and an output end. A signal, which represents the transmission ratio, is computed in dependence upon a primary rpm of the drive end and a secondary rpm of the output end which are transmitted to the arrangement. A fault signal is generated which is dependent upon the instantaneous primary rpm and/or the instantaneous secondary rpm and indicates whether a value for the transmission ratio is to be outputted as the signal representing the transmission ratio. This value is computed from the detected instantaneous values for the primary rpm and the secondary rpm.

18 Claims, 3 Drawing Sheets

ARRANGEMENT AND METHOD FOR DETERMINING THE TRANSMISSION RATIO OF A CONTINUOUSLY VARIABLE BELT TRANSMISSION

BACKGROUND OF THE INVENTION

U.S. Pat. No. 6,050,913 discloses a control circuit for adjusting the tension of the belt part of a belt transmission. The belt part has a drive end and an output end. Sensors detect various operating parameters of the vehicle. The known control circuit includes a circuit component which computes the value for the transmission ratio by division of the primary rpm by the secondary rpm. The value computed in this way is needed by the control circuit for additional computations and therefore, for example, for the control of the tension of the belt part or for the adjustment of the transmission ratio. In this way, a value representing the transmission ratio is computed from the signals for the primary rpm of the drive end and the secondary rpm of the output end which signals are transmitted to the control circuit. However, this value need not correspond in each case to the actual transmission ratio.

SUMMARY OF THE INVENTION

With the invention, it is advantageously avoided that the signal, which represents the transmission ratio, is still computed from the instantaneous primary rpm and the secondary rpm when such a computation is unsatisfactory or would lead to results deviating greatly from the actual transmission ratio. In order to avoid the output of a signal for the transmission ratio which is not suitable for further processing, check means are advantageously provided which generate a fault signal which indicates whether a value for the transmission ratio, which is computed from the detected instantaneous values for the primary rpm and the secondary rpm, is to be outputted as the signal which represents the transmission ratio. This fault signal is dependent on the instantaneous primary rpm and/or the instantaneous secondary rpm.

In an advantageous embodiment, it is provided that the signal, which represents the transmission ratio, is read out of a read-only-memory or a stored characteristic line, in the event that the fault signal indicates that the value for the transmission ratio, which is computed from the instantaneously detected values for the primary rpm and the secondary rpm, should not be outputted as the signal representing the transmission ratio.

It is especially advantageous when the fault signal is generated in dependence upon a comparison of the instantaneous rpm and/or the secondary rpm to pregivable parameter ranges.

In this way, especially the rpm ranges having low rpms are precluded for the computation for which a computation of the transmission ratio from the instantaneous detected values for the primary rpm and the secondary ram could lead to results deviating greatly from the actual transmission ratio.

In an especially advantageous embodiment, the value for the transmission ratio, which is computed from the instantaneously detected values for the primary rpm and the secondary rpm, is outputted as the signal, which represents the transmission ratio, provided the instantaneous primary rpm lies within a third parameter range and, simultaneously, a value, which is computed from the instantaneous primary rpm, for the amount of a gradient of the primary rpm lies within a further pregivable parameter range. Accordingly, if the primary rpm would fall within a transition range, in which the computation of the transmission ratio only leads to an unsatisfactory result when the primary rpm changes greatly over time, then, in dependence upon the time-dependent change of the primary rpm, a decision is made as to whether the transmission ratio can still be computed from the values for the primary rpm and the secondary rpm.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
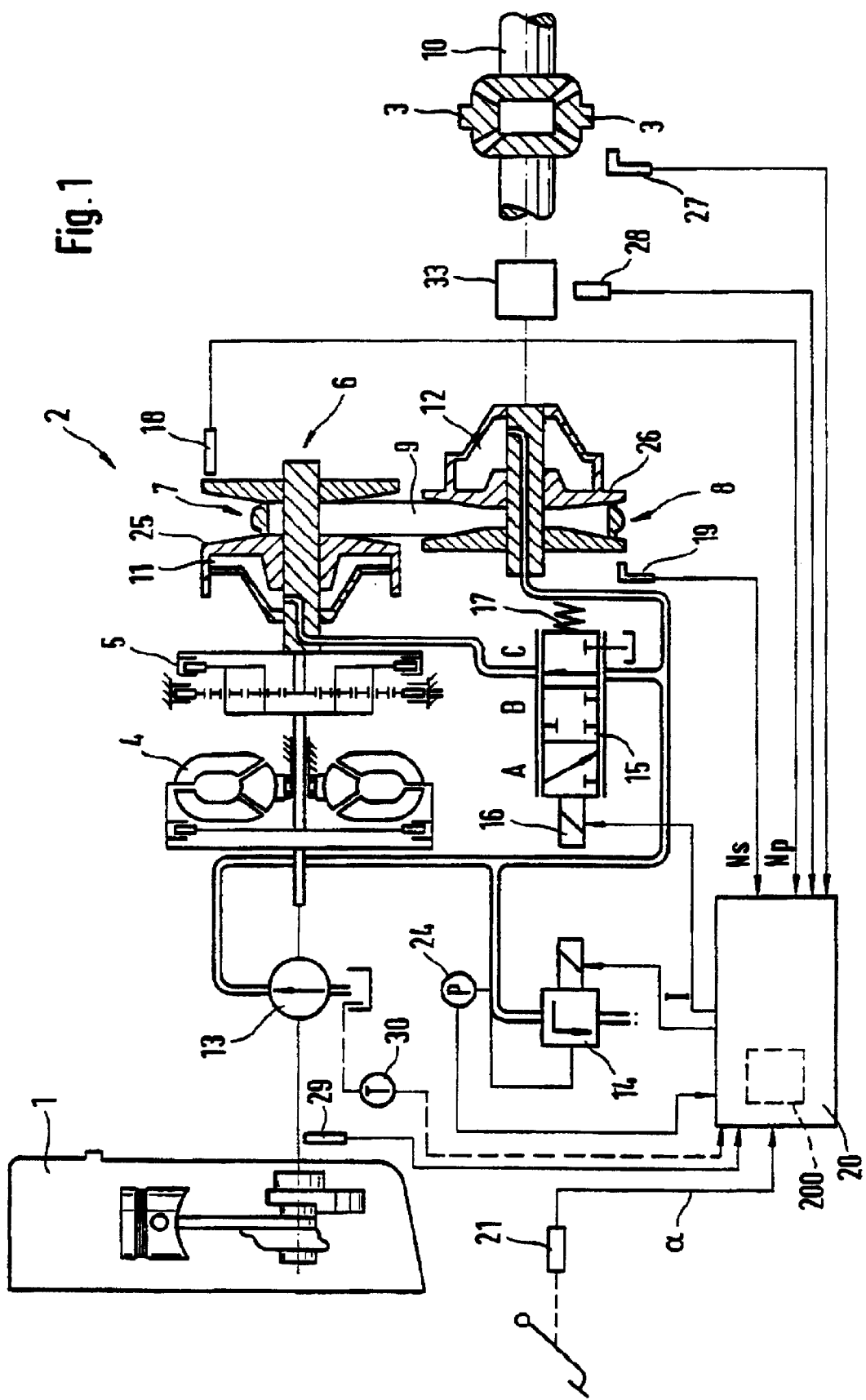
FIG. 1 is an overview of a continuously variable transmission.

In FIG. 1, reference numeral 2 identifies a continuously variable belt transmission for the purpose of transmitting force from the engine 1 to the drive shafts 3 of the wheels of a motor vehicle. Such a continuously variable transmission has, for example, a torque converter 4 and clutches 5 for forward travel shifting and rearward travel shifting. The torque converter 4 and the clutches 5 are mounted between the engine 1 and a variator 6. The variator 6 preferably includes a drive end conical pulley unit 7 and an output-end conical pulley unit 8. Each unit includes an axially fixed disc and an axially movable disc provided as an adjusting member. Accordingly, the drive end conical pulley unit 7 has, for example, the axially displaceable conical disc 25 and the output-end conical disc unit 8 includes the axially displaceable conical disc 26. The axially displaceable conical discs 25 and 26 are hydraulically adjustable and have, for this purpose, the fluid chambers 11 and 12 which can, for example, be filled with oil as the fluid. Output-end conical disc unit 8 is connected to the drive shafts 3 of the wheels via a differential gear. On the output end, switchable transmission stages 33 can be additionally provided between the conical disc unit 8 and the drive shaft 3 of the wheels. With the aid of a belt part 9, which is configured as a chain or a thrust element band, the force is transmitted from the drive-end conical disc unit 7 to the output-end conical disc unit 8. With a simultaneous variation of the axially movable discs (25, 26) on the drive disc unit and the output disc unit, the ratio of the variator 6 changes between a high start-drive transmission ratio in the position "low" and a low transmission ratio in the position "overdrive".

The drive-end primary fluid chamber and the output end secondary fluid chamber can, for example, be supplied with pressurized oil via an oil pump 13. The oil pump 13 can, for example, be driven at the rpm of the engine 1 for supplying the pressurized oil. The tension of the belt part 9 can be adjusted with the aid of a pressure-limiting valve 14 which regulates the oil pressure in the secondary fluid chamber 12. The transmission ratio is adjusted with the aid of a primary valve 15 at the primary end. The primary valve 15 is configured as a proportional valve.

As shown in FIG. 1, an rpm transducer 18 detects the primary rpm Np of the drive-end conical disc unit 7 and an rpm transducer 19 detects the secondary rpm Ns of the output-end conical disc unit 8. Furthermore, a sensor 27 is shown which detects the vehicle speed VFz and a sensor 24 which detects the secondary pressure Ps which operates also on the secondary output-end fluid chamber 12. The signals for the primary rpm Np, the secondary rpm Ns, the vehicle speed VFz and the secondary pressure Ps are all supplied to a transmission control apparatus 20 wherein a control circuit is arranged. This control circuit can also be mounted in an engine control apparatus or even in several control apparatus or control modules connected to each other. The data, which are detected by the sensors and are transmitted to the control circuit, are referred to as operating parameters in the following. The control circuit of the transmission control apparatus 20 can, in dependence upon the operating parameters for the driving state of the motor vehicle which are supplied to the control circuit, for example, generate a control signal I, which adjusts the primary valve 15, or a control signal which adjusts the pressure-limiting valve 14.

Figure 2:
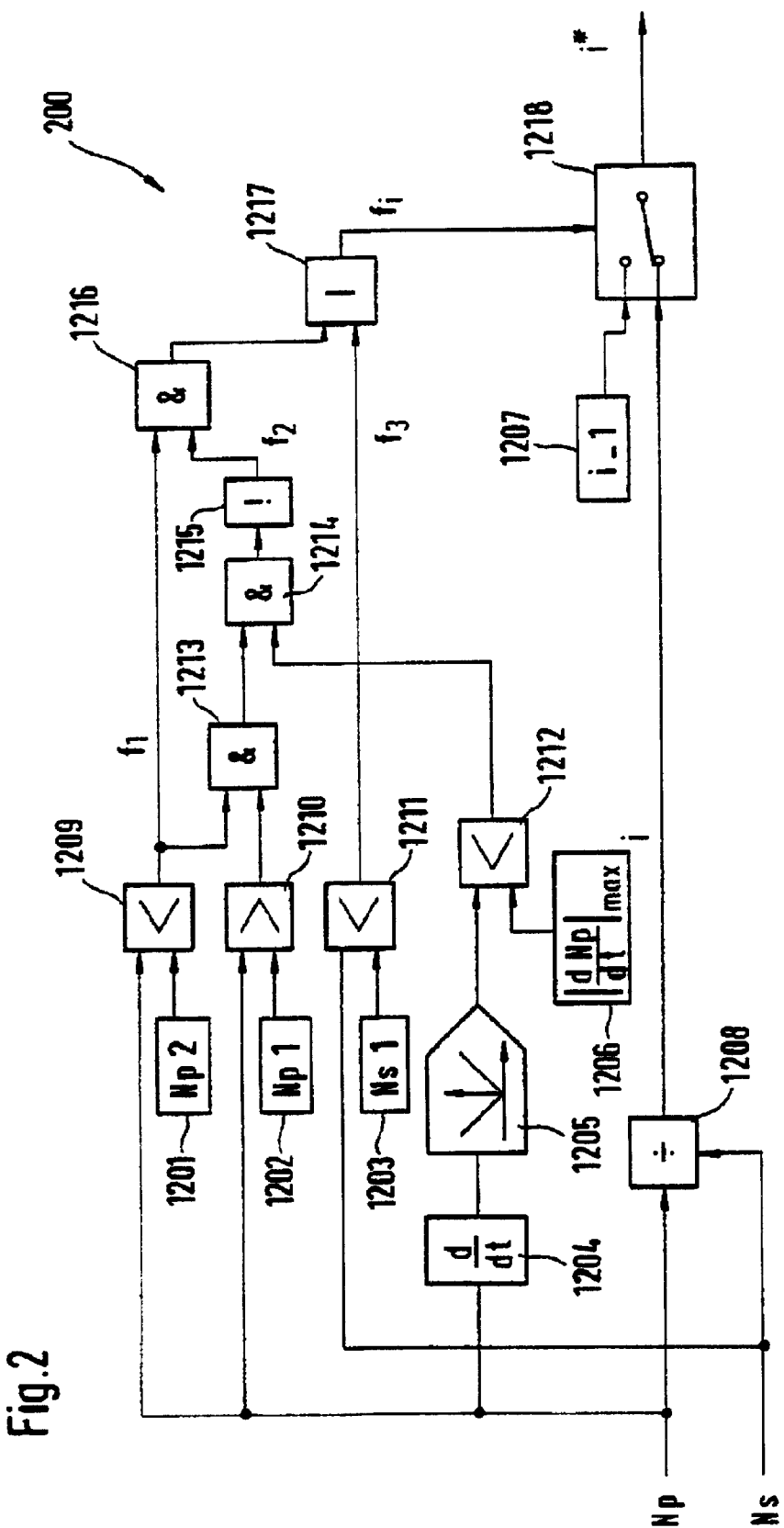
FIG. 2 is a block circuit diagram which computes a signal, which represents the transmission ratio, in dependence upon the instantaneous primary rpm Np of the drive end and of the secondary rpm Ns of the output end.

The control circuit, which is arranged in the control apparatus 20, includes a circuit part 200 which computes a signal i* representing the transmission ratio. This signal i* is computed in dependence upon the instantaneous primary rpm Np of the drive end 7 and the secondary rpm Ns of the output end E. This circuit part 200 is shown in FIG. 2.

The block 1208 forms a value i for the instantaneous transmission ratio from the transmitted signals for the instantaneous primary rpm Np and the instantaneous secondary rpm Ns by division. This value i is supplied to the input of the switch 1218. The other input of the switch 1218 is connected to a read-only-memory 1207 wherein a value i_1 is stored. In the event that the fault signal fi, which is transmitted by the block 1217, assumes the value 1 (that is, in the event the fault signal assumes the value "logic true"), the value i_1 of the memory 1207 is outputted by the circuit part 200 as the signal representing the transmission ratio. In the event that the fault signal fi, which is transmitted from the block 1217, assumes the value 0 (in the event that the signal assumes the value "logic false"), the value i, which is computed in block 1208, is outputted as the signal representing the transmission ratio.

The binary fault signal fi therefore indicates whether the value i for the transmission ratio should be outputted or not as the signal i* by the arrangement 200. The value i is computed from the primary and secondary rpm and the signal i* represents the transmission ratio.

The primary rpm Np is compared to a threshold value Np2 in the comparator 1209. The threshold value Np2 is stored in the memory 1201. If the primary rpm Np is less than the threshold value Np2, then the output signal f1 of the comparator 1209 is "logic true".

If the primary rpm Np is greater than a threshold value Np1, which is stored in the memory 1202, then the comparator 1210 supplies the value "logic true". The output signal of the block 1213 is "logic true" when the output signal f1 is logic true and the signal, which comes from the comparator 1210, is logic true. In all other cases, the signal 1213 is logic false.

By differentiating the primary rpm Np, the block 1204 computes an expression dNp/dt for the gradient of the primary rpm, that is, for the speed or rapidity of the time-dependent change of the primary rpm Np. In block 1205, the amount of the gradient is formed. The comparator 1212 checks whether the value $|dNp/dt|$ for the magnitude of the gradient of the primary rpm is less than an upper limit value $|dNp/dt|max$ for the amount of the gradient. This upper limit value is stored in the memory 1206. If this is the case, then the output signal of the comparator 1212 is "logic true".

The block 1214 supplies the value "logic true" if the signals of the blocks 1213 and 1212 are logic true. The output signal of the block 1214 is made negative in block 1215 and forms the signal f2. The signal f2 is therefore logic false when the primary rpm Np is less than a threshold value Np2 and the primary rpm Np is greater than a further threshold value Np1 and when the magnitude of the gradient of the primary rpm is less than the value $|dNp/dt|max$.

If the comparator 1211 yields that the signal for the secondary rpm Ns is less than the limit value Ns1, which is stored in the memory 1203, then the comparator 1211 supplies the value "logic true" as output signal f3.

The signal, which is formed by the block 1216, is logic true when the signal f1 and the signal f2 are logic true. The signal fi is formed by the block 1217 and is logic true when f1 and f2 are logic true or f3 is logic true.

When the signal fi is logic false, the computed value i is outputted as the signal is representing the transmission ratio. If the signal fi is logic true, then the signal i*, which represents the transmission ratio, is set to the value of the memory 1207.

Figure 3:
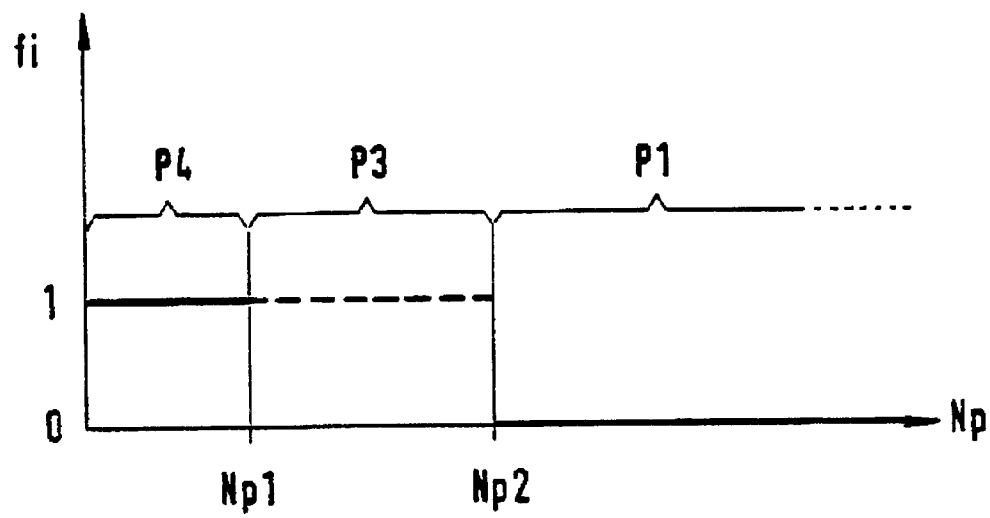
FIG. 3 is a graph showing the dependency of the fault signal on pregivable parameter ranges; and, FIG. 4 is another plot of the fault signal showing the dependency thereof on pregivable parameter ranges.
Figure 4:
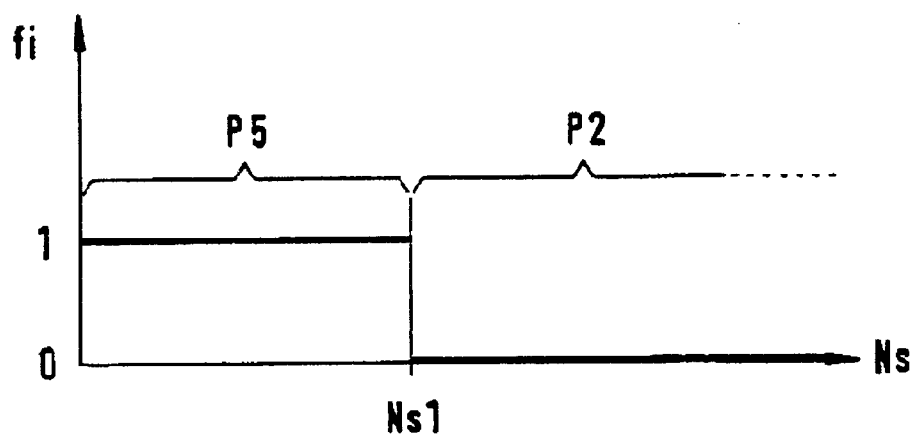

The fault signal fi is shown in FIG. 3 plotted as a function of the primary rpm Np and is shown in FIG. 4 plotted as a function of the secondary rpm Ns. In the event that the primary rpm Np lies within the parameter range P1 above the threshold value Np2 or in the event that the secondary rpm Ns lies in the parameter range P2 above the threshold value Ns1, then the fault signal fi is logic false and the value i* for the transmission ratio can be formed from the quotient of primary rpm and secondary rpm. Furthermore, the fault signal fi is logic false when the primary rpm lies in the parameter range P3 and, simultaneously, the value $|dNp/dt|$ for the magnitude of the gradient of the primary rpm is less than the pregivable limit value $|dNp/dt|max$; otherwise, the fault value fi is logic true. If the primary rpm lies in the parameter range P4 or the secondary rpm lies in the parameter range P5 or if the primary rpm Np lies in the parameter range P3 and the value $|dNp/dt|$ for the magnitude of the gradient of the primary rpm is greater than the pregivable limit value $|dNp/dt|max$, then the fault signal fi is logic true and the value i*, which represents the transmission ratio, is not formed from the quotient of primary rpm and secondary rpm.

In another embodiment, it can be provided that a value $|dNs/dt|$ is evaluated for the magnitude of the gradient of the secondary rpm. The formation of the magnitude of the gradient dNp/dt or dNs/dt can be omitted and, in lieu thereof, two threshold values (dNp/dt)max and (dNp/dt)min or (dNs/dt)max and (dNs/dt)min can be applied.

It is understood that the foregoing description is that of the preferred embodiments of the invention and that various changes and modifications may be made thereto without departing from the spirit and scope of the invention as defined in the appended claims.

What is claimed is:

1. An arrangement for determining the transmission ratio of a continuously variable belt transmission having a drive end and an output end, the arrangement comprising:

first sensor means for detecting the primary rpm (Np) at said drive end and supplying said primary rpm (Np) to said arrangement;

second sensor means for detecting the secondary rpm (Ns) at said output end and supplying said secondary rpm (Ns) to said arrangement;

computing means (200) for computing a signal (i*) in dependence upon said primary rpm (Np) and said secondary rpm (Ns) with said signal (i*) representing said transmission ratio; and, checking means for generating a fault signal (fi) dependent upon at least one of said primary rpm (Np) and said secondary rpm (Ns) with said fault signal (fi) indicating whether a value (i) for said transmission ratio, which is computed from the detected instantaneous values of said primary rpm (Np) and said secondary rpm (Ns), is to be outputted as said signal (i*).

2. The arrangement of claim 1, further comprising: means (1218) for reading out said signal (i*) from one of a read-only-memory and a stored characteristic line in the event that said fault signal (fi) indicates that said value (i) for said transmission ratio is not to be outputted as said signal (i*).

3. The arrangement of claim 1, wherein said fault signal (fi) is generated in dependence upon a comparison of at least one of said instantaneous primary rpm (Np) and said instantaneous secondary rpm (Ns) to pregiven parameter ranges.

4. The arrangement of claim 1, wherein said fault signal (fi) indicates that said value (i) for the transmission ratio is to be outputted in the event that at least one of said instantaneous primary rpm (Np) lies within a first pregivable parameter range (P1) and said instantaneous secondary rpm (Ns) lies within a second pregivable parameter range (P2).

5. The arrangement of claim 1, wherein:
a first value for the gradient of said primary rpm is derived from said primary rpm (Np);
a second value for the gradient of said secondary rpm is derived from said secondary rpm (Ns); and,
said fault signal (fi) is generated in dependence upon a comparison of at least one of said first and second values to pregivable parameter ranges.

6. The arrangement of claim 1, wherein a value ($|dNp/dt|$) is computed from the instantaneous primary rpm (Np) for the magnitude of a gradient of said primary rpm (Np_; and, said fault signal (fi) for the transmission ratio is to be outputted as said signal (i*), which represents said transmission ratio, in the event that the instantaneous primary rpm (Np) lies within a third parameter range (P3) and, at the same time, said value ($|dNp/dt|$) lies within a further pregivable parameter range.

7. The arrangement of claim 6, wherein at least one of said parameter ranges is pregivable by at least one upper and lower limit values (Np1, Ns2, Ns1, $|dNp/dt|max$).

8. The arrangement of claim 1, further comprising means (1208) for forming the value (i) for the transmission ratio by division from the instantaneously detected values for the primary rpm (Np) and the secondary rpm (Ns).

9. A method for determining the transmission ratio of a continuously variable transmission having a drive end and an output end, the method comprising the steps of:
computing a signal (i*) representing said transmission ratio in dependence upon a primary rpm (Np) of said drive end and a secondary rpm (Ns) of said output end; and,
generating a fault signal (fi) dependent upon at least one of the instantaneous primary rpm (Np) and the instantaneous secondary rpm (Ns) with said fault signal (fi) indicating whether a value (i) for said transmission ratio, which is computed from the detected instantaneous values of said primary rpm (Np) and said secondary rpm (Ns), is to be outputted as said signal (i*).

10. The method of claim 9, further comprising the step of:
reading out said signal (i*) from one of a read-only-memory and a stored characteristic line in the event that said fault signal (fi) indicates that said value (i) for said transmission ratio is not to be outputted as said signal (i*).

11. The method of claim 9, further comprising the step of generating said fault signal (fi) in dependence upon a comparison of at least one of said instantaneous primary rpm (Np) and said instantaneous secondary rpm (Ns) to pregiven parameter ranges.

12. The method of claim 9, wherein said fault signal (fi) indicates that said value (i) for the transmission ratio is to be outputted in the event that at least one of said instantaneous primary rpm (Np) lies within a first pregivable parameter range (P1) and said instantaneous secondary rpm (Ns) lies within a second pregivable parameter range (P2).

13. The method of claim 9, comprising the further steps of:
deriving a first value for the gradient of said primary rpm from said primary rpm (Np);
deriving a second value for the gradient of said secondary rpm from said secondary rpm (Ns); and,
generating said fault signal (fi) in dependence upon a comparison of at least one of said first and second values to pregivable parameter ranges.

14. The method of claim 9, comprising the further step of computing a value ($|dNp/dt|$) from the instantaneous primary rpm (Np) for the magnitude of a gradient of said primary rpm (Np_; and, outputting said fault signal (fi) for the transmission ratio as said signal (i*), which represents said transmission ratio, in the event that the instantaneous primary rpm (Np) lies within a third parameter range (P_3) and, at the same time, said value ($|dNp/dt|$) lies within a further pregivable parameter range.

15. The method of claim 14, wherein at least one of said parameter ranges is pregivable by at least one upper and lower limit values (Np1, Np2, Ns1, $|dNp/dt|max$).

16. The method of claim 9, the method further comprising the step of forming the value (i) for the transmission ratio by division from the instantaneously detected values for the primary rpm (Np) and the secondary rpm (Ns).

17. A control circuit for adjusting the transmission ratio of a continuously variable belt transmission having a drive end and an output end, the control circuit comprising:
first sensor means for detecting the primary rpm (Np) at said drive end and supplying said primary rpm (Np) to said arrangement;
second sensor means for detecting the secondary rpm (Ns) and supplying said secondary rpm (Ns) to said arrangement;
computing means (200) for computing a signal (i*) in dependence upon said primary rpm (Np) and said secondary rpm (Ns) with said signal (i*) representing said transmission ratio; and,
checking means for generating a fault signal (fi) dependent upon at least one of said primary rpm (Np) and said secondary rpm (Ns) with said fault signal (fi) indicating whether a value (i) for said transmission ratio, which is computed from the detected instantaneous values of said primary rpm (Np) and said secondary rpm (Ns), is to be outputted as said signal (i*).

18. A control circuit for adjusting the tension of a continuously variable belt transmission having a drive end and an output end, the control circuit comprising:

first sensor means for detecting the primary rpm (Np) at said drive end and supplying said primary rpm (Np) to said arrangement;

second sensor means for detecting the secondary rpm (Ns) and supplying said secondary rpm (Ns) to said arrangement;

computing means (200) for computing a signal (i*) in dependence upon said primary rpm (Np) and said secondary rpm (Ns) with said signal (i*) representing said transmission ratio; and, checking means for generating a fault signal (fi) dependent upon at least one of said primary rpm (Np) and said secondary rpm (Ns) with said fault signal (fi) indicating whether a value (i) for said transmission ratio, which is computed from the detected instantaneous values of said primary rpm (Np) and said secondary rpm (Ns), is to be outputted as said signal (i*).

* * * * *

UNITED STATES PATENT AND TRADEMARK OFFICE
CERTIFICATE OF CORRECTION

PATENT NO. : 6,748,309 B2
DATED : June 8, 2004
INVENTOR(S) : Joachim Luh

It is certified that error appears in the above-identified patent and that said Letters Patent is hereby corrected as shown below:

Column 5,
Line 40, delete "(Np_" and insert -- (Np) -- therefor.
Line 49, delete "values (Np1, Ns2, Ns1, |dNp/dt|max)" and insert
-- value (Np1, Np2, Ns1, |dNp/dt |max) -- therefor.

Column 6,
Line 32, delete "(Np_" and insert -- (Np) -- therefor.
Line 34, delete "(P_3)" and insert -- (P3) -- therefor.
Line 41, delete "values" and insert -- value -- therefor.

Signed and Sealed this

Fourth Day of January, 2005

JON W. DUDAS
*Director of the United States Patent and Trademark Office*